United States Patent
Thommana et al.

(10) Patent No.: US 11,889,399 B2
(45) Date of Patent: Jan. 30, 2024

(54) MILITARY CENTRAL UNITS AND DISTRIBUTED UNITS

(71) Applicant: Rockwell Collins, Inc., Cedar Rapids, IA (US)

(72) Inventors: John V. Thommana, Cedar Rapids, IA (US); James A. Stevens, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 17/443,536

(22) Filed: Jul. 27, 2021

(65) Prior Publication Data

US 2023/0036904 A1 Feb. 2, 2023

(51) Int. Cl.
*H04W 40/02* (2009.01)
*H04W 84/00* (2009.01)

(52) U.S. Cl.
CPC .......... *H04W 40/02* (2013.01); *H04W 84/005* (2013.01)

(58) Field of Classification Search
None
See application file for complete search history.

(56) References Cited

U.S. PATENT DOCUMENTS

| | | | | |
|---|---|---|---|---|
| 7,068,998 | B2* | 6/2006 | Zavidniak | H04W 12/122 455/410 |
| 7,675,852 | B1* | 3/2010 | Arundale | H04W 72/56 455/418 |
| 7,839,900 | B1* | 11/2010 | Herder | H04B 1/713 370/545 |
| 7,970,947 | B1* | 6/2011 | Frank | H04W 28/06 709/249 |
| 9,887,768 | B1* | 2/2018 | Thommana | H04B 7/2696 |
| 10,805,856 | B2* | 10/2020 | Fiorani | H04W 36/38 |

(Continued)

FOREIGN PATENT DOCUMENTS

| | | | |
|---|---|---|---|
| EP | 3482602 A1 | 5/2019 | |
| WO | WO-2019148389 A1 * | 8/2019 | ......... H04B 7/18506 |

(Continued)

OTHER PUBLICATIONS

IEEE 802.11 and 3GPP 5G System Interworking, Binita Gupta, Intel Corporation, Tutorial at IEEE 802 Plenary, Oct. 2020.

*Primary Examiner* — Khaled M Kassim
*Assistant Examiner* — Berhanu D Belete
(74) *Attorney, Agent, or Firm* — Suiter Swantz pc llo

(57) ABSTRACT

A communication system is disclosed. The communication system includes a first core network that is mobile, and a radio access network, which includes a first central unit and one or more distributed units. The first central unit includes a first router containing a multi-level security guard configured to route user plane data and control plane data to the first core network. The first central unit further includes a transceiver, a control plane interface coupled to the core network, and a second router configured to communicate user plane data and control plane data to one or more first distributed units. The central unit configures at least one network function of radio resource control (RRC). The one or more distributed units configures at least one network function of packet data convergence protocol (PDCP), radio link control (RLC), medium access control (MAC), and physical link (PHY) network functions.

12 Claims, 13 Drawing Sheets

(56) References Cited

U.S. PATENT DOCUMENTS

| | | | |
|---|---|---|---|
| 11,026,004 B2 | 6/2021 | Das | |
| 2006/0236365 A1* | 10/2006 | Pham | H04L 63/105 |
| | | | 726/1 |
| 2007/0038743 A1* | 2/2007 | Hellhake | H04L 61/5014 |
| | | | 709/224 |
| 2007/0071028 A1* | 3/2007 | Dorris | H04L 69/166 |
| | | | 370/476 |
| 2013/0128726 A1* | 5/2013 | Hellhake | H04L 61/5014 |
| | | | 370/225 |
| 2014/0087722 A1* | 3/2014 | Brittain | H04W 88/06 |
| | | | 455/426.1 |
| 2014/0099940 A1* | 4/2014 | Kim | H04W 24/10 |
| | | | 455/422.1 |
| 2016/0261670 A1* | 9/2016 | Lyon | H04L 67/025 |
| 2016/0337820 A1* | 11/2016 | Yousefi'zadeh | H04L 12/1877 |
| 2017/0048278 A1* | 2/2017 | Tomasso | H04L 63/10 |
| 2019/0097858 A1* | 3/2019 | Stuart | H04L 27/2613 |
| 2019/0190914 A1* | 6/2019 | Tomasso | H04L 63/10 |
| 2020/0059821 A1 | 2/2020 | Wirth et al. | |
| 2020/0068631 A1* | 2/2020 | Wang | H04W 76/22 |
| 2020/0236727 A1 | 7/2020 | Salkintzis | |
| 2020/0288359 A1* | 9/2020 | Kim | H04W 36/026 |
| 2020/0296799 A1 | 9/2020 | Barabell et al. | |
| 2020/0322042 A1* | 10/2020 | Rainish | H04B 7/18513 |
| 2020/0359244 A1 | 11/2020 | Yao et al. | |
| 2021/0006371 A1* | 1/2021 | Raghothaman | H04W 72/21 |
| 2021/0050969 A1* | 2/2021 | Chou | H04W 72/23 |
| 2021/0092120 A1* | 3/2021 | Tomasso | H04L 63/0272 |
| 2021/0160562 A1 | 5/2021 | Wong et al. | |
| 2021/0243613 A1* | 8/2021 | Khanfouci | H04L 41/0895 |
| 2021/0281493 A1* | 9/2021 | Miller | H04L 69/08 |
| 2021/0337412 A1* | 10/2021 | Zhu | H04W 74/0841 |
| 2021/0345206 A1* | 11/2021 | Akl | H04W 48/16 |
| 2022/0028280 A1* | 1/2022 | Kotecha | H04W 12/069 |
| 2022/0069893 A1* | 3/2022 | Abedini | H04W 48/10 |
| 2022/0240103 A1* | 7/2022 | Gummadi | H04W 36/305 |
| 2022/0256366 A1* | 8/2022 | Thommana | H04B 7/18513 |
| 2022/0345484 A1* | 10/2022 | Drozd | H04W 12/67 |

FOREIGN PATENT DOCUMENTS

| | | | | |
|---|---|---|---|---|
| WO | 2020067346 A1 | 4/2020 | | |
| WO | 2020098954 A1 | 5/2020 | | |
| WO | WO-2020112897 A1 * | 6/2020 | | H04L 41/147 |
| WO | 2020160176 A1 | 8/2020 | | |
| WO | 2020200410 A1 | 10/2020 | | |
| WO | 2020260921 A3 | 2/2021 | | |
| WO | 2021034906 A1 | 2/2021 | | |
| WO | WO-2022019646 A1 * | 1/2022 | | |
| WO | WO-2022078824 A1 * | 4/2022 | | |

* cited by examiner

MILITARY CENTRAL UNITS AND DISTRIBUTED UNITS

BACKGROUND

Tactical communication systems may employ a variety of strategies aimed at preventing jamming or interference from adversaries. For example, the tactical communication system may operate at different frequencies or utilize different waveforms at different times. In another example, the tactical communication system may operate multiple or redundant waveforms at the same time. The use of multiple waveforms and/or frequencies forces the adversary to utilize considerable resources to jam and deny friendly communications. Currently, the addition of componentry within the tactical communication systems to support multiple waveforms and wavelengths is formidable, as the cost of retrofitting or replacing network equipment and user equipment is expensive. Accordingly, there is a need for a communication system that facilitates the addition of additional waveforms without extensive labor and/or cost inputs.

SUMMARY

A communication system is disclosed. In one or more embodiments, the communication system includes a first core network, wherein the first core network is mobile. In one or more embodiments, the communication system further includes a radio access network. In one or more embodiments, the radio access network includes a first central unit. In one or more embodiments, the first central unit includes a user plane interface communicatively coupled to the first core network. In one or more embodiments, the first central unit includes a control plane interface communicatively coupled to the first core network. In one or more embodiments, the first central unit further includes a transceiver. In one or more embodiments, the first central unit further includes a first router. In one or more embodiments, the first router includes a multilevel security guard. In one or more embodiments, the first router is configured to route user plane data and control plane data to the first core network. In one or more embodiments, the central unit includes a second router configured to communicate user plane data and control plane data to one or more first distributed units. In one or more embodiments, the central unit configures at least one network function of radio resource control (RRC). In one or more embodiments, the radio access network includes the one or more first distributed units. In one or more embodiments, the one or more first distributed units configures at least one network function of packet data convergence protocol (PDCP), radio link control (RLC), medium access control (MAC), and physical link (PHY) network functions.

In some embodiments of the communication system, the first central unit and the one or more first distributed units are localized on separate mobile platforms.

In some embodiments of the communication system, the communication system further includes a second central unit communicatively coupled to the first central unit via an Xn interface.

In some embodiments of the communication system, the communication system includes one or more second distributive units communicatively coupled to the second central unit.

In some embodiments of the communication system, the communication system further includes a second core network communicatively coupled to the second central unit.

In some embodiments of the communication system, the communication system is configured to communicate with a tactical radio via a tactical waveform that does not conform to a 5G protocol standard.

In some embodiments of the communication system, the communication system further includes a tactical radio interface, wherein one of the one or more first distributed units is configured to communicate with the tactical radio through the tactical radio interface via an interface translation.

In some embodiments of the communication system, the communication system is configured to communicate with via a 5G protocol standard and at least one tactical waveform.

In some embodiments of the communication system, communication system further comprises a plurality of radio access networks, each covering a cell, wherein two or more radio access networks of the plurality of radio access networks overlap and are each operable with at least one of differing frequency bands or differing waveforms.

In some embodiments of the communication system, the first core network is configured to communicate with at least one of the Secret Internet Protocol Network (SIPRNet) or the Non-classified Internet Protocol Router Network (NIPRnet).

In some embodiments of the communication system, at least one tactical waveform is selected from a list comprising 5G Low band, 5G Mid band, 5G High band, PTW, BE-CDL, TTNT, TSM, Link-16, and HF waveforms.

A method for routing data from a user equipment to a first core network is also disclosed. In one or more embodiments, the method includes receiving a first signal encoding data via a first distribution unit sent from a first user equipment. In one or more embodiments, the method further includes receiving a second signal encoding the data via a second distribution unit from a first user equipment or a second user equipment, wherein the second signal is configured as a different frequency, or a different waveform than the first signal. In one or more embodiments, the method further includes performing at least one interface translation via a tactical radio interface, generating processed data. In one or more embodiments, the method further includes sending the processed data to the core network.

In some embodiments of the method, the first core network is configured as mobile.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
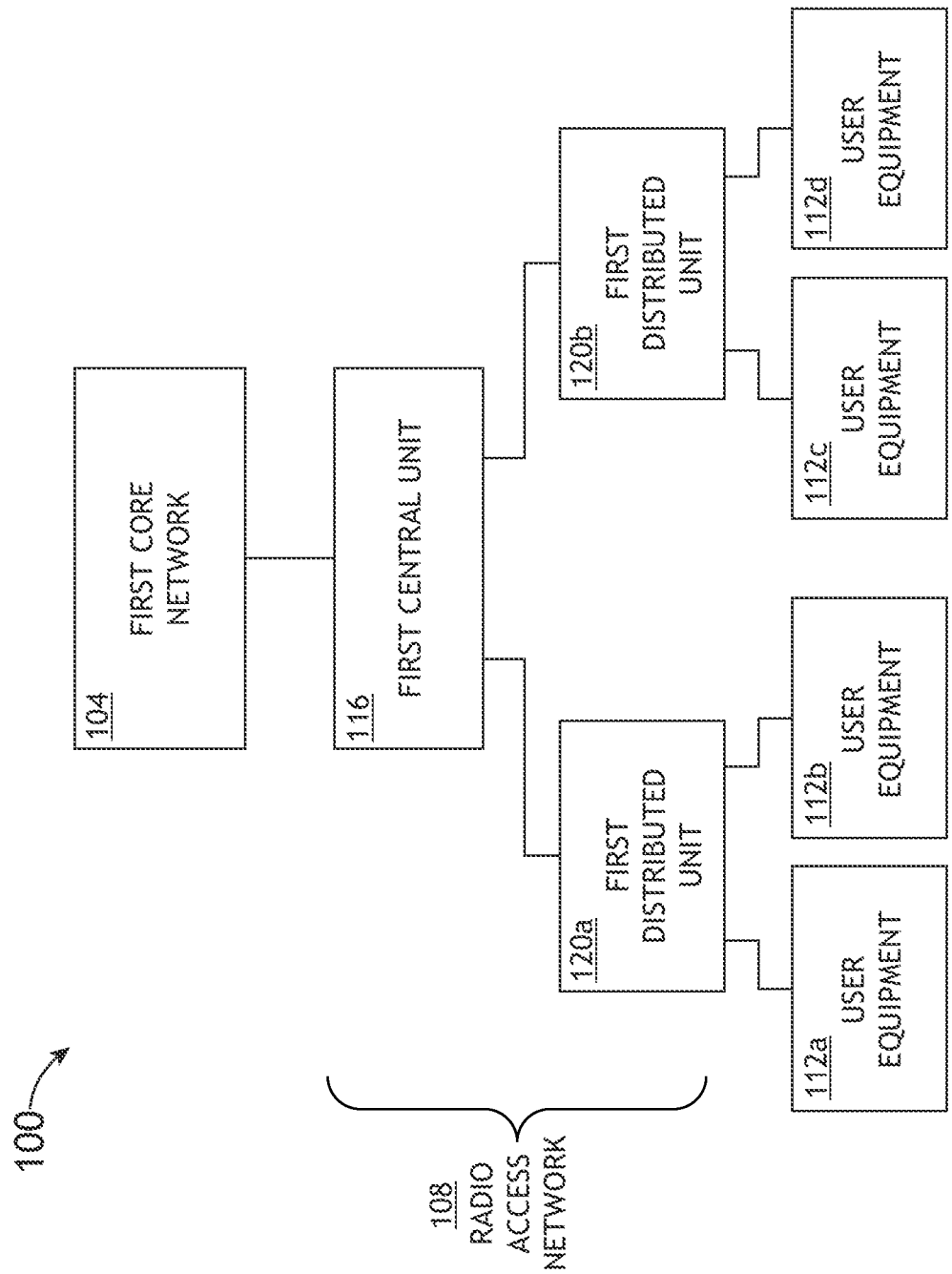
FIG. 1 is a block diagram illustrating a communication system 100 in accordance with one or more embodiments of the disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A communication system based on fifth generation (5g) networking architecture that facilitates the incorporation of tactical waveform operability and modularity without substantial labor or cost input is disclosed. The communication system takes advantage of the open architecture and modularity of 5G, creating central unit (CU) and distributed unit (DU) splits, as well as multiple platform configurations, that facilitate the use of multiple waveforms within the communication system while requiring minor changes to legacy user equipment, such as tactical radios. The communication system seamlessly integrates 5G networks with these tactical networks to take advantage of link diversity, optimal or redundant routing, and/or ability to deliver higher data/network throughput when 5G networks are available. The ability of the communication system to utilize multiple waveforms and/or frequencies facilitate communication between users while concurrently confounding jamming efforts by adversaries.

FIG. 1 is a block diagram illustrating a communication system 100 in accordance with one or more embodiments of the disclosure. The communication system 100 is configured to deploy 5G service as well as one or more tactical waveforms.

In embodiments, the communication system 100 includes a core network 104 configured to provide a path for the exchange of networks or subnetworks. For example, the core network 104 may provide a path to the Secret Internet Protocol Network (SIPRNet), a system of interconnect computer networks used by the U.S. Department of Defense and the U.S. Department of State to transmit classified information. In another example, the core network 104 may provide a path to the Non-classified Internet Protocol Router Network (NIPRNet), used to exchange unclassified information subject to controls on distribution. In another example, the core network 104 may provide a path to the Joint Worldwide Intelligence Communication System (JWICS) used to exchange information of top secret and sensitive compartmented information. The core network 104 may communicate with any land-based or mobile-based, or satellite-based network. For example, the core network 104 may provide a path to the SIPRNet and/or NIPRNet via a wireless link with a communication satellite.

In embodiments, the communication system 100 includes a first radio access network 108 communicatively coupled to the first core network 104 and to one or more user equipment 112a-d, deploying communication service within a cell. The radio access network 108 implements radio access technology that is the underlying physical connection method for the communication system 100. The communication system 100 may include or omit the user equipment 112a-d. In some embodiments, the communication system 100 may include a plurality radio access networks 108, each covering a cell, wherein overlap between the cells may be minimal to prevent interference, or maximal to utilize the distributive, redundant and/or distributive resources of the communication system 100. For example, two radio access networks 108 may overlap, each utilizing different frequency bands and/or waveforms that frustrate jamming efforts by adversaries.

Figure 2:
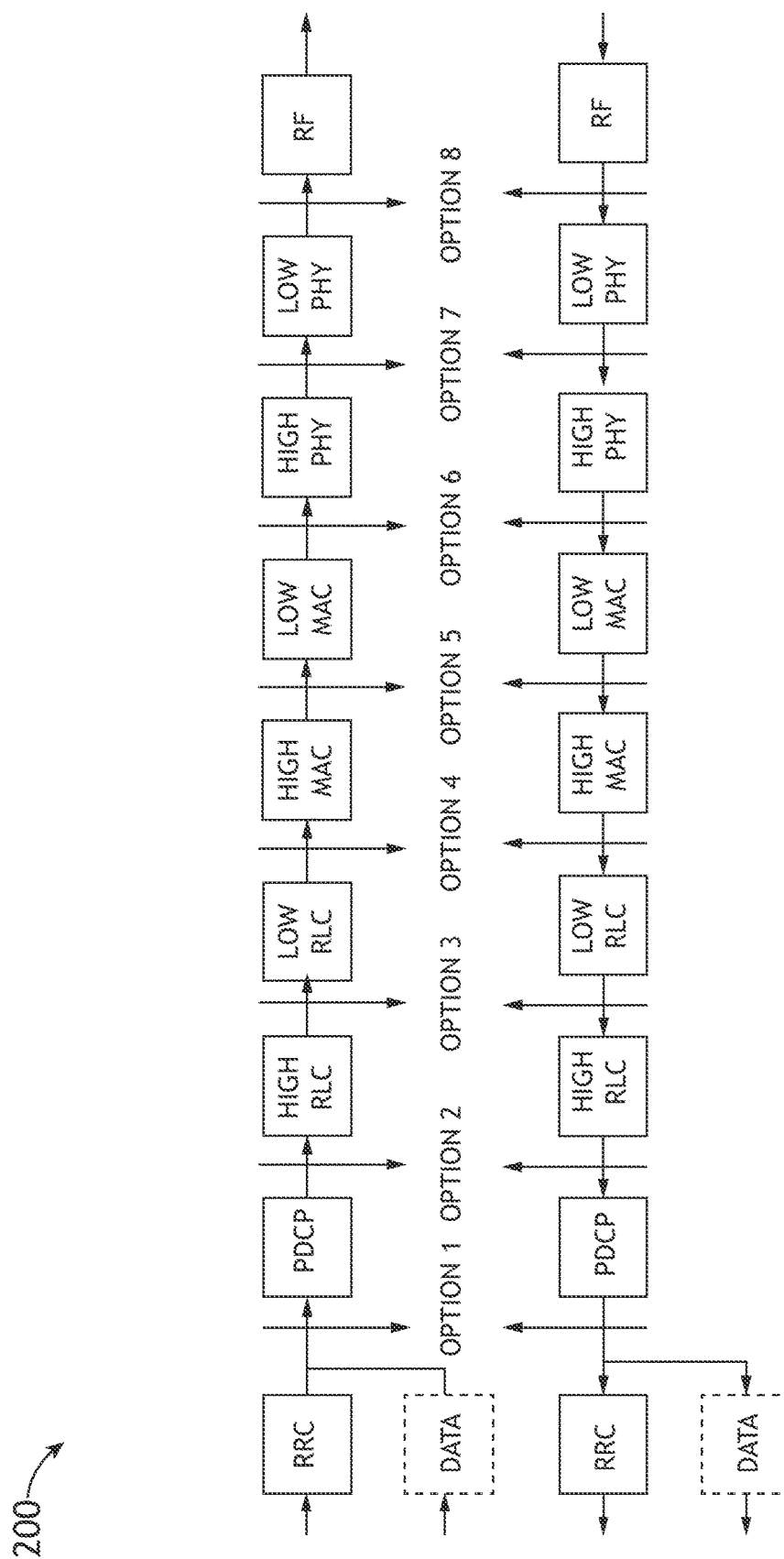
FIG. 2 is a block diagram illustrating potential central unit and distributed unit splits of the radio access network protocol stack, in accordance with one or more embodiments of the disclosure.

Functionality of the first radio access network 108 may be shared between a first central unit 116 and one or more first distributed units 120a-b. Together, the first central unit 116 and the one or more distributed units 120a-b perform some or all of the functions of a protocol stack 200 of the first radio access network 108, as illustrated in FIG. 2, in accordance with one or more embodiments of the disclosure. The concept of splitting the radio access network 108 was introduced as part of the OpenRAN initiative, as part of 3GPP Release 14. The communication system 100 leverages the functional splits to enable the incorporation of tactical networks as part of the 5G network to create a seamless tactical heterogenous network in contested theaters. The components of the protocol stack 200 may be divided into as many as eight different areas or options. For example, in option 1, radio resource control (RRC) functionality may be performed by the first central unit 116 with packet data convergence protocol (PDCP), high radio link control (RLC), low RLC, high medium access control (MAC), low MAC, high physical link (PHY), and low PHY functions, along with RF processing performed by the first distributed units 120a-b. In another example, in option 2, RRC and PDCP functionality may be performed by the primary central unit 116, with high RLC, low RLC, high MAC, low MAC, high PHY, and low PHY functions, along with RF processing performed by the first distributed units 120a-b. When combined within the same unit, high RLC and low RLC, high MAC and low MAC, and high PHY and Low PHY, may be stated as simply RLC, MAC, and PHY respectively.

Figure 3:
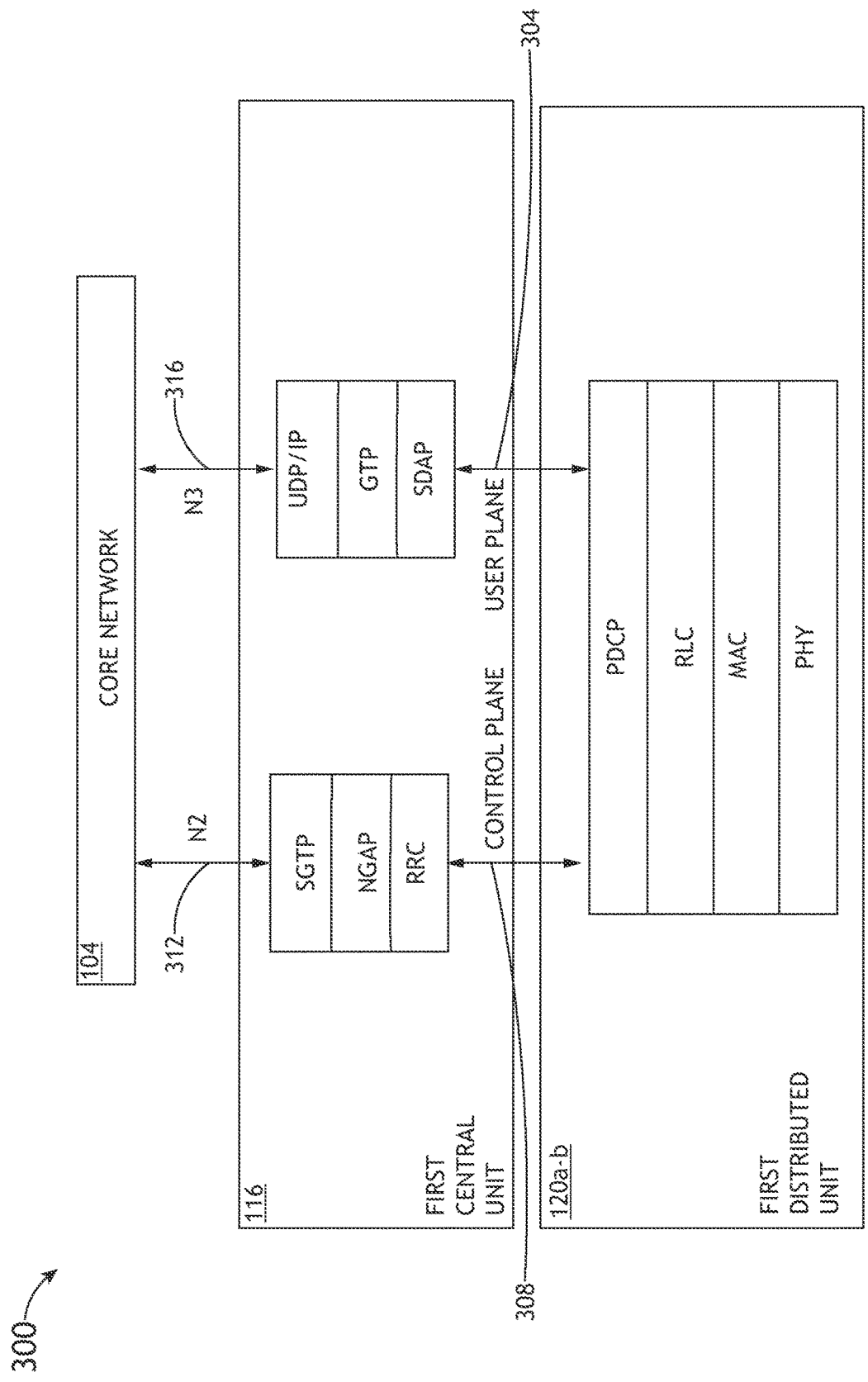
FIG. 3 is a diagram illustrating an in-depth view of the split of radio access network functionality via option 1, in accordance with one or more embodiments of the disclosure.

In some embodiments, the first radio access network 108 splits functionality according to option 1 of FIG. 2, with the first central unit 116 providing RCC functionality, with the first distributed units 120a-b providing PDCP, RLC MAC, PHY and/or RF functionality. The use of option 1 facilitates the incorporation of tactical networks as part of the 5G network to create a seamless tactical heterogeneous in contested theaters. An in-depth diagram 300 of the split of first radio access network 108 functionality via option 1 is shown in FIG. 3, in accordance with one or more embodiments of the disclosure. As detailed above, the first distributive units 120a-b provide PDCP, RLC, MAC, and PHY functionality, and send data to the first central unit via the control plane 304 and the user plane 308, which processes data and relays the processed data to the core network 104 via the control plane interface 312 and the user plane interface 316, respectively. For example, data processed through the control plane may be processed via the RRC protocol, a next generation application protocol (NGAP), and the stream control transmission protocol (SCTP), whereas data processed through the user plane may be processed via a service data adaptation protocol (SDAP), a general packet radio service (GPRS) tunneling protocol (GTP), and a Universal Datagram Protocol (UDP) or Internet Protocol (IP).

Splitting the first radio access network 108 via option 1 allows non-cellular protocols, such as Wi-Fi, to interface between the first central unit 116 and the first distributed units 120a-b without the need to add or remove 5G-related header and control information, potentially simplifying communication and decreasing latency. Other splits within the first radio access network 108 may be utilized within the communication system 100. However, these splits may increase the complexity and/or latency of communication between the first central unit 116 and the first distributed units 120a-b. For example, splitting the first radio access network 108 via option 2 would require adding and/or removing 5G-related headers and control information when communicating via non-cellular waveforms, potentially increasing communication complexity and latency. While the communication system 100 utilizes the option 1 in contested areas, the communication system may utilize any other split in non-contested areas.

Figure 4:
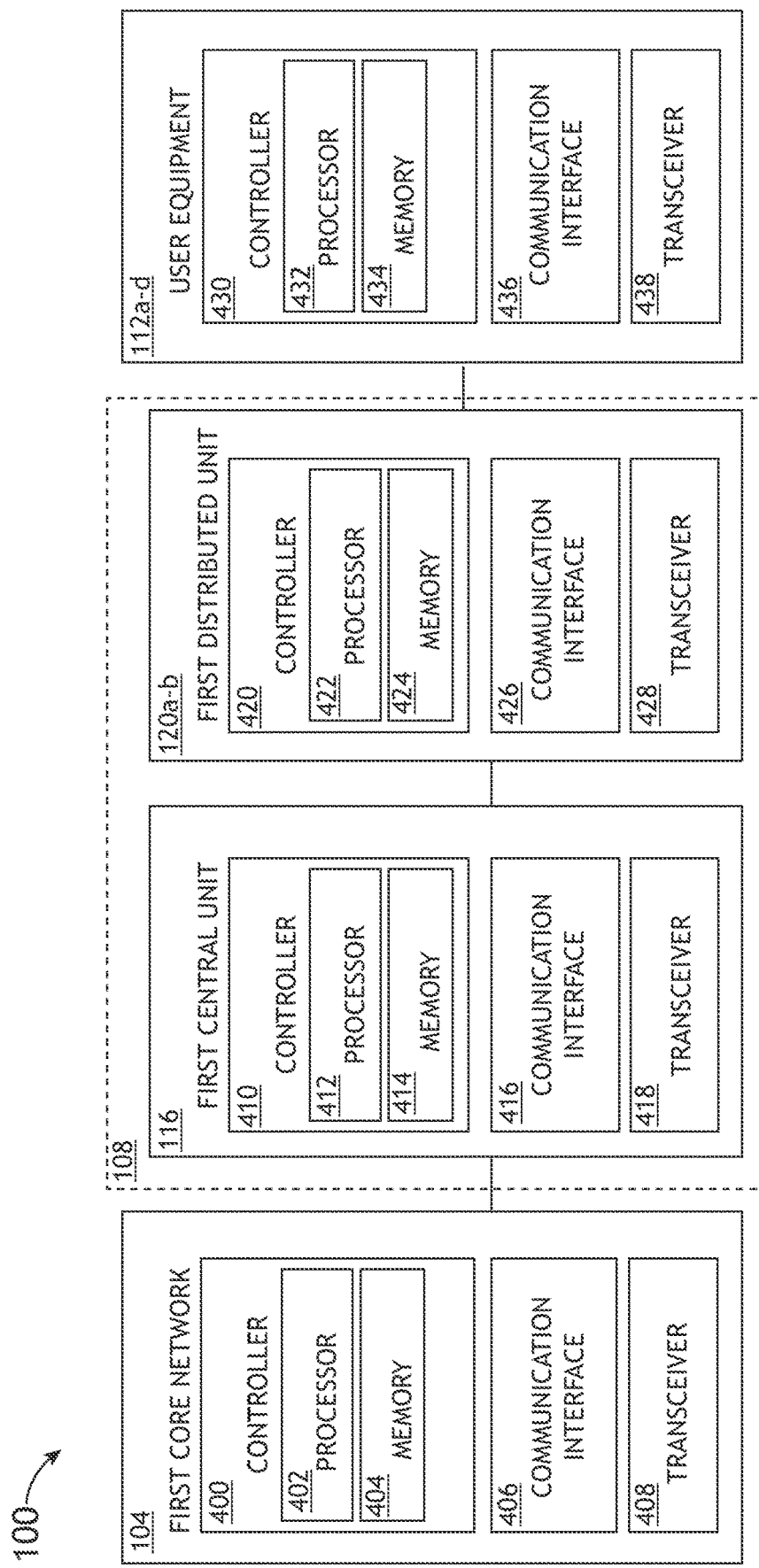
FIG. 4 is a block diagram illustrating componentry of the communication system, in accordance with one or more embodiments of the disclosure.

FIG. 4 is a block diagram illustrating componentry of the communication system 100, in accordance with one or more embodiments of the disclosure. In some embodiments, the first core network 104, the first central unit 116, the first distributed unit 120a-b, and the user equipment 112a-d are each stand-alone platforms that communicate with each other via transceivers 408, 418, 428, 438, respectively. However, one or more or the first core network 104, the first central unit 116, the first distributed unit 120a-b, and the user equipment 112a-d may share, or otherwise be physically connected to, a same platform. For example, the first central unit 116 and one of the first distributed units 120a may share the same platform (e.g., aboard an unmanned aerial vehicle (UAV)). In another example, the first core network 104 may share the same platform as the first central unit 116 and/or the first distributed unit (e.g., of a UAV). Communication systems 100 having shared platforms between the first core network 104, the first central unit 116, the first distributed unit 120a-b, and the user equipment 112a-d may also then share componentry. For example, a platform shared by the first central unit 116 and the first distributed unit 120a may share a receiver 418, 428. Therefore, the above description should not be considered a limitation of the present disclosure, but merely an illustration.

The between the first core network 104, the first central unit 116, the first distributed unit 120a-b, and the user equipment 112a-d further include a controller 400, 410, 420, 430 configured to provide processing functionality for the first core network 104, the first central unit 116, the first distributed unit 120a-b, and the user equipment 112a-d, respectively.

The controller 400, 410, 420, 430 includes one or more processors 402, 412, 422, 432 (e.g., micro-controllers, circuitry, integrated circuits, field programmable gate arrays (FPGA), or other processing systems), and resident or external memory 404, 414, 424, 434 for storing data, executable code, and other information. The controller 400, 410, 420, 430 can execute one or more software programs embodied in a non-transitory computer readable medium (e.g., memory 404, 414, 424, 434) that implement techniques described herein. The controller 400, 410, 420, 430 is not limited by the materials from which it is formed or the processing mechanisms employed therein and, as such, can be implemented via semiconductor(s) and/or transistors (e.g., using electronic integrated circuit (IC) components), and so forth.

The memory 404, 414, 424, 434 can be an example of tangible, computer-readable storage medium that provides storage functionality to store various data and/or program code associated with operation of the controller 400, 410, 420, 430, such as software programs and/or code segments, or other data to instruct the controller 400, 410, 420, 430, and possibly other components of the first core network 104, the first central unit 116, the first distributed unit 120a-b, and the user equipment 112a-d (e.g., transceiver 408, 418, 428, 438, to perform the functionality described herein. Thus, the memory 404, 414, 424, 434 can store data, such as a program of instructions for operating the first core network 104, the first central unit 116, the first distributed unit 120a-b, and the user equipment 112a-d, including its components (e.g., controller 400, 410, 420, 430), and so forth. It should be noted that while a single memory 404, 414, 424, 434 is described, a wide variety of types and combinations of memory 404, 414, 424, 434 (e.g., tangible, non-transitory memory) can be employed. The memory 404, 414, 424, 434 can be integral with the controller 400, 410, 420, 430, can comprise stand-alone memory, or can be a combination of both. Some examples of the memory 404, 414, 424, 434 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

The first core network 104, the first central unit 116, the first distributed unit 120a-b and the user equipment 112a-d each further includes a communication interface 406, 416, 426, 436. The communication interface 406, 416, 426, 436 can be operatively configured to communicate with components of the first core network 104, the first central unit 116, the first distributed unit 120a-b and the user equipment 112a-d. For example, the communication interface 406, 416, 426, 436 can be configured to retrieve data from the controller 400, 410, 420, 430 or other components, transmit data for storage in the memory 404, 414, 424, 434, retrieve data from storage in the memory 404, 414, 424, 434, and so forth. The communication interface 406, 416, 426, 436 can also be communicatively coupled with the controller 400, 410, 420, 430 to facilitate data transfer between components of the first core network 104, the first central unit 116, the first distributed unit 120a-b and the user equipment 112a-d. It should be noted that while the communication interface 406, 416, 426, 436 is described as a component of the controller 400, 410, 420, 430, one or more components of the communication interface 406, 416, 426, 436 can be implemented as external components communicatively coupled to the controller 400, 410, 420, 430 via a wired and/or wireless connection. It should be understood that the type or number of processors 208, memory, or communication interface may differ between the first core network 104, the first central unit 116, the first distributed unit 120a-b and the user equipment 112a-d.

Figure 5A:
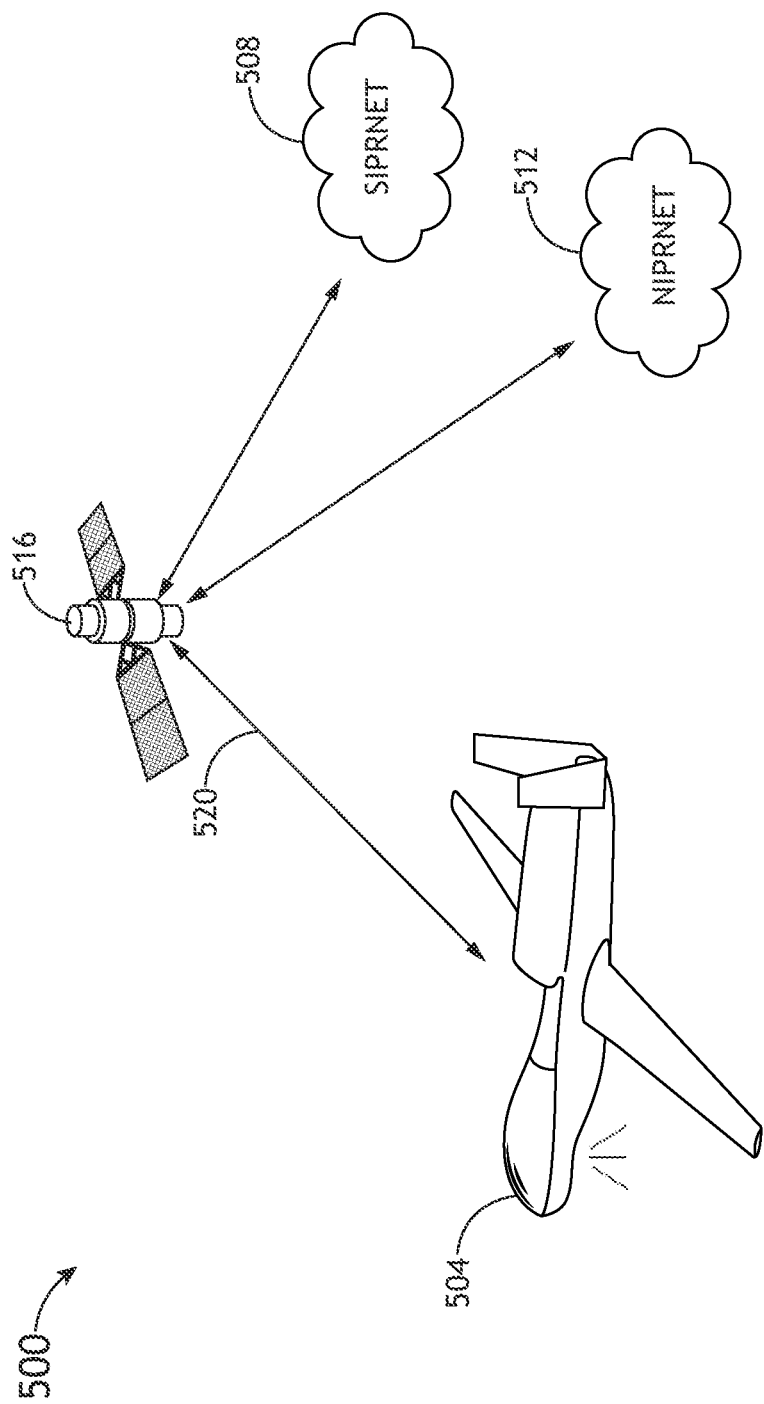
FIG. 5A is a drawing of a communication system configured with a first radio access network and a first core network colocalized on a same platform in accordance with one or more embodiments of the disclosure.
Figure 5B:
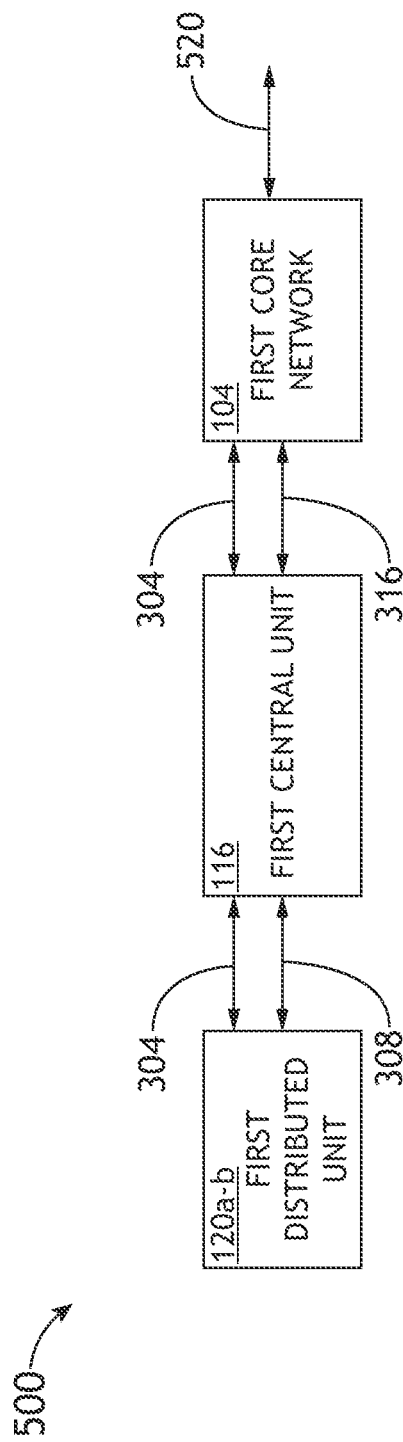
FIG. 5B is a block diagram of a communication system configured with a first radio access network and a first core network colocalized on a same platform in accordance with one or more embodiments of the disclosure.

FIG. 5A-B are a drawing and a block diagram, respectively, of a communication system 500 configured with a first radio access network 108 and a first core network 104 colocalized on a same platform (e.g., a military UAV 504) in accordance with one or more embodiments of the disclosure. The communication system 500 contains one or more, or all, components of the communication system 100 and vice versa. The first core network 104, the first central unit 116 and the one or more first distributed units 120a-b are all located within the military UAV 504, which may communicate with the SIPRNet 508 and/or the NIPRNet 512 via a communication satellite 516 relay, unitizing an external interface 520 that facilitated communication between external data networks and a user plane function in the first core network 104. It is to be understood that while military UAVs 504 are used here to illustrate the communication system 500, the communication network may be configured with any other type of mobile platform including but not limited to vehicular platforms (e.g., trucks, tanks, personnel carriers) or maritime vehicles (e.g., boats and ships). Therefore, the above description should not be considered a limitation of the present disclosure, but merely an illustration.

It is to be understood that while military UAVs 504 are used here to illustrate the communication system 500, the communication network may be configured with any other type of mobile platform including but not limited to vehicular platforms (e.g., trucks, tanks, personnel carriers) or maritime vehicles (e.g., boats and ships). Therefore, the above description should not be considered a limitation of the present disclosure, but merely an illustration.

Figure 6:
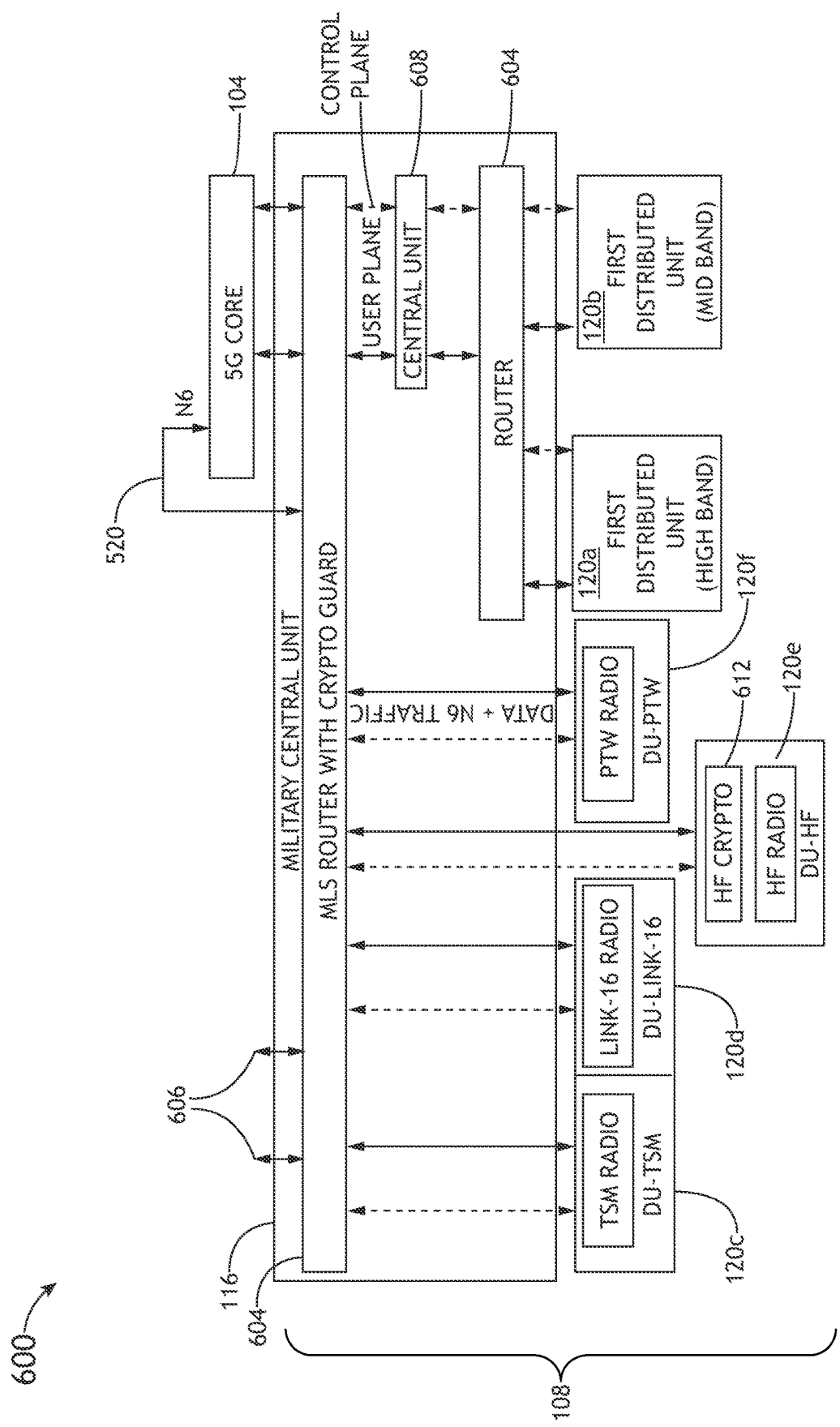
FIG. 6 is a block diagram illustrating a functional representation of the communication system configured with a colocalized first core network 104 and radio access network, in accordance with one or more embodiments of the disclosure.

FIG. 6 is a block diagram illustrating a functional representation of the communication system 500 configured with a colocalized first core network 104 and radio access network 108, in accordance with one or more embodiments of the disclosure. The communication system 500 further includes a first router 604 that itself includes a multilevel security guard. The first router 604 is configured to route user plane data from one or more non-5G waveforms to the core network 104 as well as to a mission computer via mission computer interfaces 606. The communication system 500 may also include a second router 604 configured to route user plane data from 5G waveforms (e.g., high-band, mid-band, or low-band 5G waveforms from the first distributed units 120a-b) to the central unit 116 or a 5G-specific central unit 608. The second router may also include a multilevel security guard.

The communication system 500, via the one or more distributed units 120a-b, may deploy message translation services (e.g., interface translation via a tactical radio interface), either as part of the mission computer or as a stand-alone gateway node connected to the first router and/or second router. For example, the one or more distributed units 120 a-b may perform interface translation to match the interface supported by the user equipment 112a-d (e.g., tactical radios), and limit the changes to the central unit 120 and the one or more distributed unit 120 a-b with only minor routing changed in the user equipment 112a-d. For instance, the communication system 500 may utilize Generic Routing Encapsulation (GRE) tunnels to route traffic between networks or subnetworks.

The communication system 500, via the option 1 split between the central unit 116 and the one or more distributed units 120a-f, creates a tactical heterogeneous network in which integrates a 5G subnetwork as well as one or more legacy and modern military subnetworks that does not conform to 5G protocol standards.

The communication system 500 may communicate via any type of waveform to any network or subnetwork including but not limited to commercial and military/tactical waveforms. For example, the communication system may communicate via Protected Tactical Waveform (PTW), Bandwidth Efficient Common Data Link (BE-CDL) waveform, Tactical Targeting Network Technology (TTNT) waveform, TrellisWare TSM™ waveform, Link-16 waveform, and HF waveforms, wherein the communication system 500 is configured with a distributed unit that facilitates communication with the respective waveform. For instance, the communication system 500 may be configured with functionality wherein a TSM radio may communicate with a TSM-specific distributed unit 120c, a Link-16 radio may communicate with a Link-16 specific distributed unit 120d, a HF radio may communicate with a HF-specific distributed unit 120e (e.g., including a HF crypto guard), and a PTW radio may communicate with a PTW-specific distributed unit 120f (e.g., the one or more distributed units 120a-f having a transceiver 428 configured to communicate with the specific waveforms).

In some embodiments, the communication system 500 is configured to route messages through nodes configured with differing waveforms. Any combination of differing waveforms is possible. For example, communication system 500 may include TTNT nodes configured to communicate with a 5G node. In another example, a TTNT user device 112a-d may be able to communicate with another TTNT user device 112a-d via a 5G relay node. For instance, TTNT distributed units 120 may communicate with a 5G core network 104 via standardized N2/N3 interfaces, wherein the core network 104 may then route traffic to a 5G central unit 116 via a another set of N2/N3 interfaces, with the 5G distributed unit 120 routing traffic to 5G user equipment 112a-d using the 5G interfaces. Similar connectivity may be configured between any two networks.

In some embodiments, the core network 104 and the radio access network 108 are split, creating a non-colocalized communication system 100. For example, the core network, residing on a core network-designated UAV may be configured with connectivity to the SIPRNet and/or the NIPRNet, with the radio access network 108 residing on a radio access network-designated UAV configured with forward haul and/or backhaul connectivity. For instance, the radio access network may communicate forward haul data via a directional radio. Directional radio includes waveforms configured to communicate via directional antennas, and are considered more secure (e.g., low probability of detection (LPD) and/or low probability or intercept (LPI)) than omni-directional waveforms, as directional radio spreads RF energy only in a limited area directed toward the receiver from the sender. Direction radio waveforms may be used in any setting, including military and/or high-security clearance settings.

In some embodiments, the radio action network 108 may be split further, with the central unit 116 and the one or more distributed units 120a-f located on separate platforms. In this manner, the core network 104 may provide service to multiple radio access networks 108, and may be maintained at a standoff distance (e.g., up to approximately 200 km) to avoid kinetic threats. The core network 104 may use a directional communication link (e.g., directional radio) to reduce the electromagnetic footprint of the core network 104, increasing stealth and decreasing risk of kinetic threats.

Figure 7A:
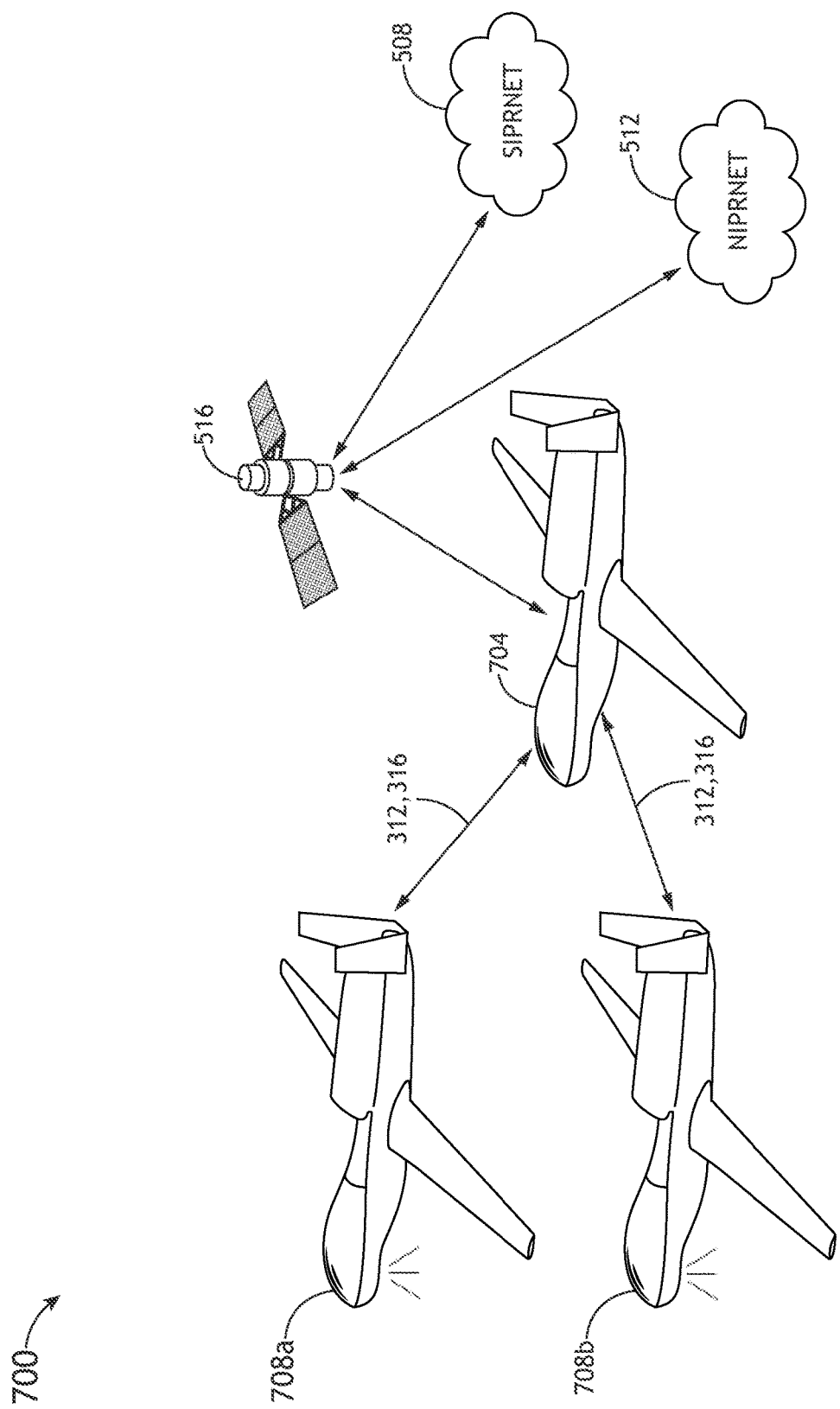
FIG. 7A is a drawing of a communication system configured with a first core network and a distributed first radio access network and localized on different platforms in accordance with one or more embodiments of the disclosure.
Figure 7B:
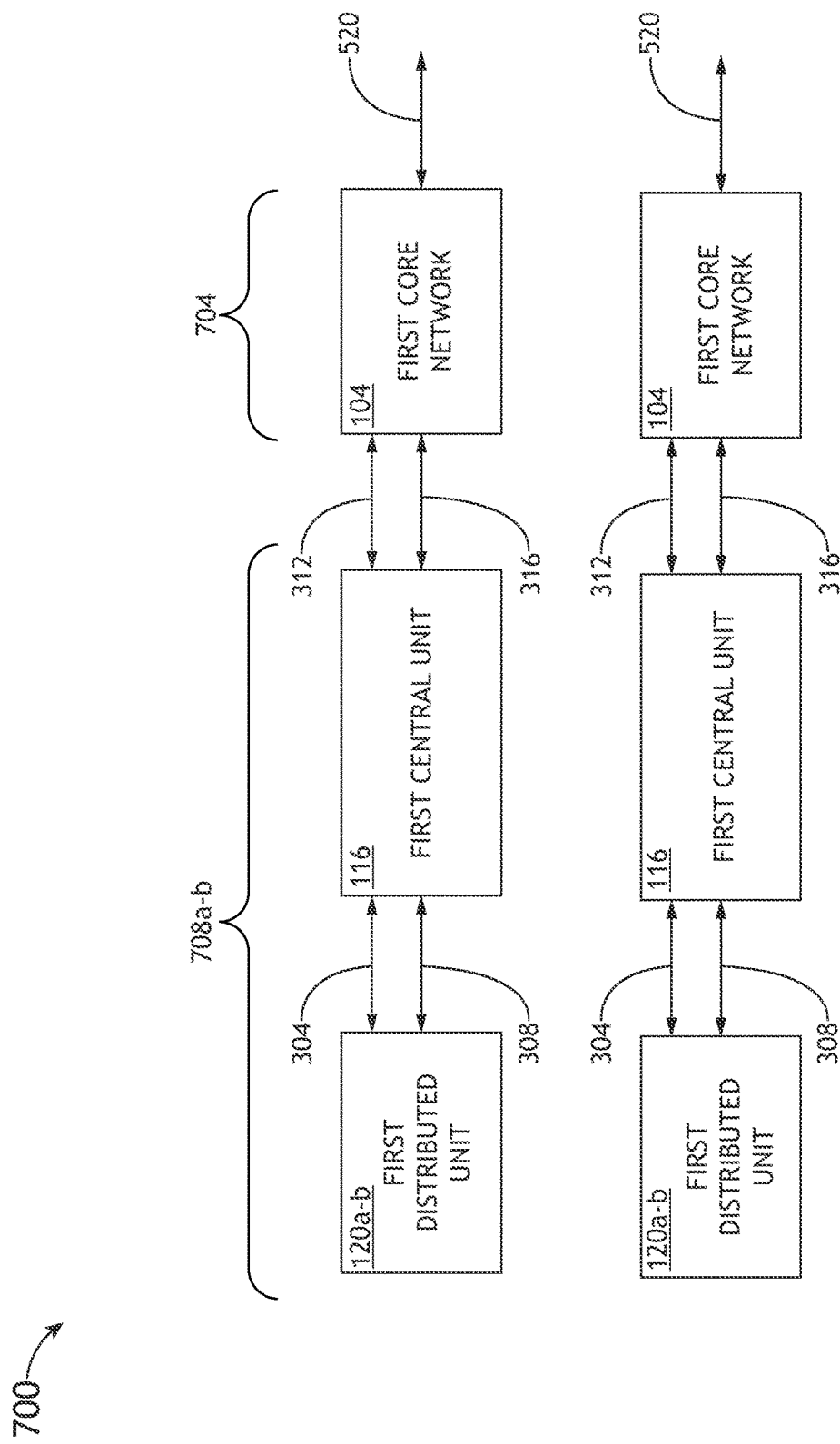
FIG. 7B is a block diagram of a communication system configured with a first core network and a distributed first radio access network and localized on different platforms in accordance with one or more embodiments of the disclosure.

FIG. 7A-B are a drawing and a block diagram, respectively, of a communication system 700 configured with a first core network 104 and a distributed first radio access network 108 and localized on different platforms (e.g., a core network UAV 704 and two radio access network UAVs 708a-b) in accordance with one or more embodiments of the disclosure. The communication system 700 contains one or more, or all, components of the communication system 100, 500 and vice versa. The first core network 104, located in the core network UAV 704 communicates with the SIPRNet 508 and/or the NIPRNet 512 via a communication satellite 516 relay. The radio access network 108 located on the radio access network UAVs 708a-b communicates with the core network 104 via the control plane interface 312 and the user plane interface 316, providing service for the user equipment 112a-d (e.g., the user equipment 112a-d configured as radios that communicate via the specific waveform as designated by the one or more distributed units 120a-f. Communication via the user plane interface 316 and/or the control plane interface 312 may be encrypted via National Security Agency (NSA) approved Type-1 encryption as required.

Figure 8A:
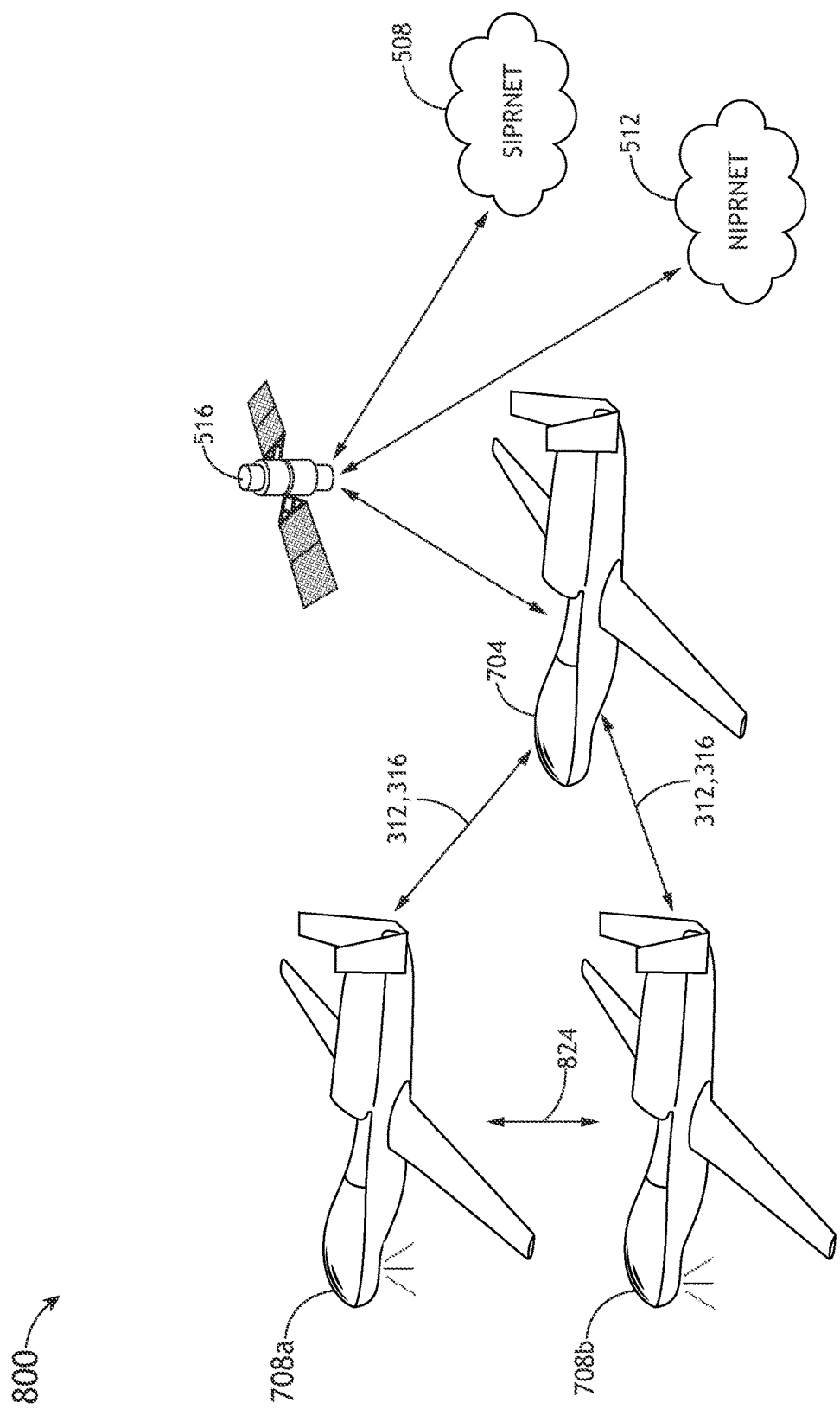
FIG. 8A is a drawing of a communication system configured with a second central unit and one or more second distributed units, wherein the second central unit is communicatively coupled to the first central unit via a Xn interface, in accordance with one or more embodiments of this disclosure.
Figure 8B:
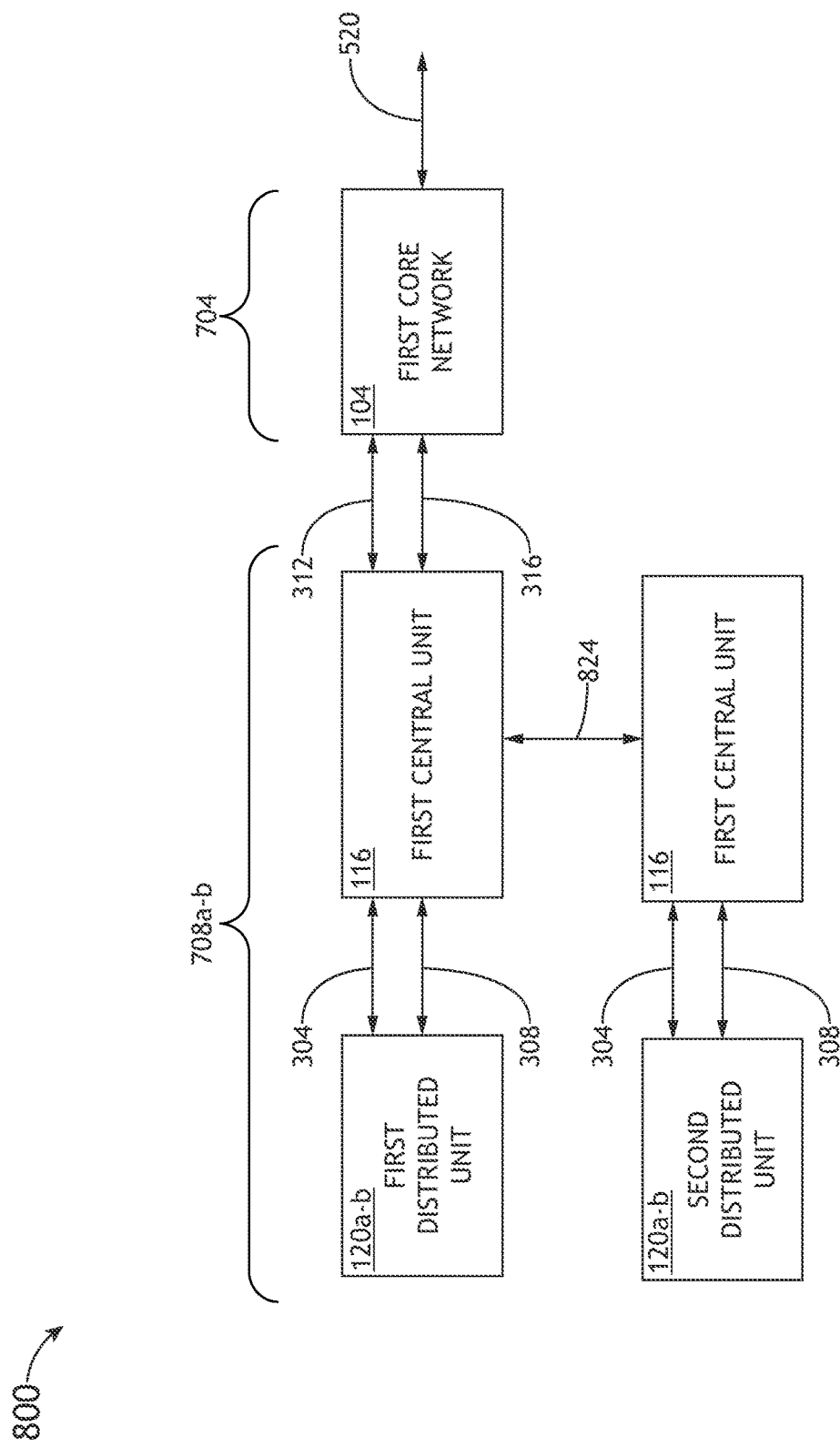
FIG. 8B is a block diagram of a communication system configured with a second central unit and one or more second distributed units, wherein the second central unit is communicatively coupled to the first central unit via a Xn interface, in accordance with one or more embodiments of this disclosure.

FIG. 8A-B are a drawing and a block diagram, respectively, of a communication system 800 configured with a second central unit 816 and one or more second distributed units 820 a-b, wherein the second central unit 816 is communicatively coupled to the first central unit 116 via a Xn interface (control plane and user plane), in accordance with one or more embodiments of this disclosure. The communication system 800 contains one or more, or all, components of the communication system 100, 500, 700 and vice versa. The 3GPP standards have defined the Xn interface to exchange information between different central units, such as the first central unit 116 and the second central unit 816. For example, an instantiation of the Xn interface may include configuring first central unit 116 and the second central unit 816, disposed on separate platforms (e.g., the radio access UAVs 108a-b), to communicate via directional radio, providing redundant 5G service.

Utilizing communication system 800, 5G service may be deployed from multiple platforms (e.g., deploying multiple radio access networks 108) deploying 5G services and/or other waveforms over different spectral bands simultaneously. Multi-band user equipment 112a-b may connect two or more radio access networks 108 simultaneously, thereby forcing an adversary to deny all 5G bands and/or other waveforms in use. Communication system 800 may also apply the Xn interface to connect central units from different platforms or domains. For example, the platform for the second central unit 816 and the one or more second distributed unit 820a-b may be configured as a military personnel carrier. It is noted that the distributed architecture in commmunication system 700 also supports Xn interface connectivity.

Figure 9:
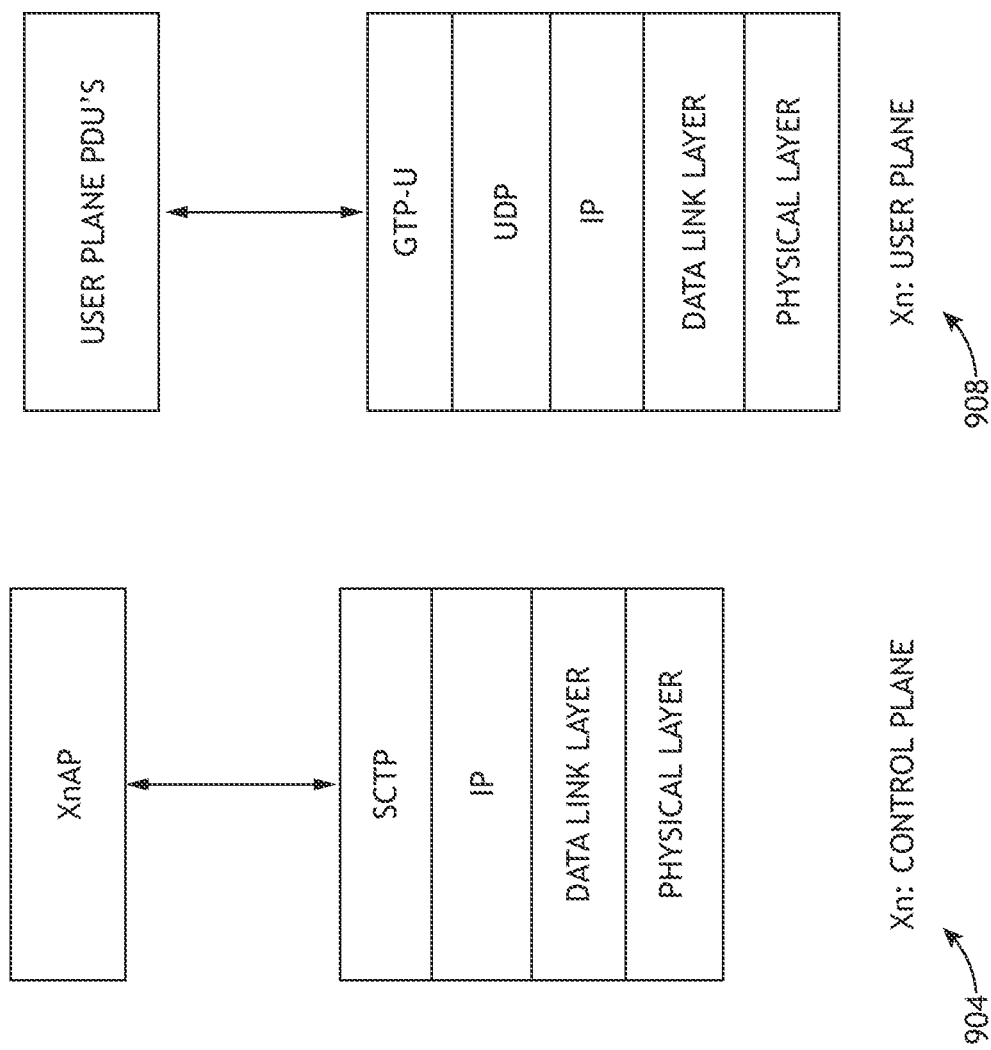
FIG. 9 illustrates a block diagram of the protocol stack for the Xn control plane and the Xn user plane, in accordance with one or more embodiments of the disclosure.

FIG. 9 illustrates a block diagram of the protocol stack for the Xn control plane 904 and the Xn user plane 908, in accordance with one or more embodiments of the disclosure. Along with a physical layer and a data linked layer the Xn control plane 904 includes an Internet Protocol transport layer (IP) and a Stream Control Transmission Protocol (SCTP), which communicates with an application layer signaling protocol or Xn application protocol (XnAP). The protocol stack for the Xn user plane 908 includes a physical layer, a data link layer, an IP layer, a user diagram protocol (UDP), and a GPRS Tunneling Protocol U (GTP-U), which communicates with user plane protocol data units (PDUs).

In some embodiments, the communication system 800 further includes a second core network communicatively coupled to the second central unit 816. The second core network may be either colocalized on the same platform as the central unit, or isolate to a specific second core platform (e.g., UAV). The second core network may be configured with similar connectivity as the first core network 104, including an external interface 520 allowing access to the SIPRNet 508 and NIPRNet 512 via the communication satellite 516 and including the control plane interface 312 and the user plane interface 316 for communication with the second central unit 816.

In some embodiments, the communication system 100, 500, 700, 800 is configured to seamlessly integrate with global and/or terrestrial 4G and/or 5G networks, and have seamless roaming between the networks. For example, the communication system 100, 500, 700, 800 may include, or be communicatively coupled to, a cellular phone that can roam between three public networks, but only when a private/military network is not available. In another example, the communication system 100, 500, 700, 800 will prevent automatic roaming between a military network and a public network in a tactical environment.

Figure 10:
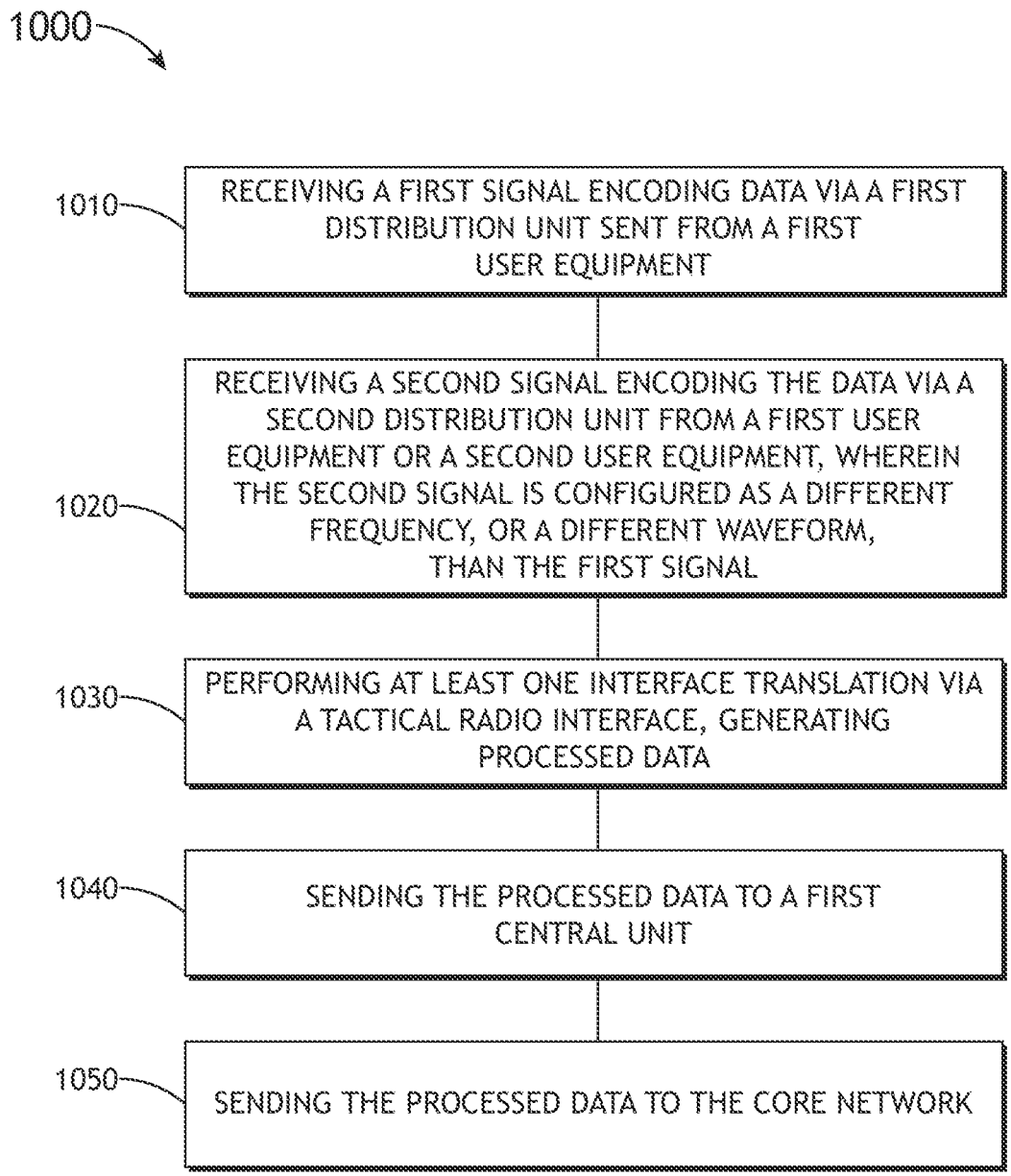
FIG. 10 is a flow chart illustrating a method for routing data from a user equipment to a first core network, in accordance with one or more embodiments of the disclosure.

FIG. 10 is a flow chart illustrating a method 1000 for routing data from a user equipment 112a-d to a first core network 104, in accordance with one or more embodiments of the disclosure. In some embodiments, the method 1000 includes a step 1010 of receiving a signal encoding data via a first distribution unit 120a-f sent from a first user equipment (e.g., user equipment 112a-d). The first signal may encode any type of data and may be configured as any frequency or waveform. For example, the first signal may be a mid-range 5G signal encoding voice data sent from a user equipment 112a (e.g., a tactical radio) that is received by a distributive unit that facilitates the reception and processing of 5G signals.

In some embodiments, the method 1000 further includes a step 1020 of receiving a second signal encoding the data via a different first distribution unit 120a-f (e.g., a "second" distribution unit) from a first user equipment or a second user equipment (e.g., user equipment 112a-d), wherein the second signal is configured as a different frequency, or a different waveform, than the first signal. For example, the user equipment 112a, configured as a tactical waveform may be configured to send both a 5G signal and a TTNT signal containing the same data. The two signals may be then be received by a first distribution unit 120a (e.g., the 5G signal), and the first distribution unit 120b (e.g., the TTNT signal).

In some embodiments, the method 1000 further includes a step 1030 of performing at least one interface translation via a tactical radio interface, generating processed data. For example, the first distribution unit 120b, having received the TTNT signal, may process the signal into a form compatible for being received by the core network 104, or other networks in communication with the core network. The 5G signal received by the first distribution unit 120a may also be processed via a tactical radio interface or other radio interface. The ability of the communication system 100 to receive two signals of differing frequency and/or waveform increased the diversity of the signal, increasing the probability that the communication system 100 will correctly receive the data, even under adversarial conditions. Once the interface translation(s) have been performed, the signals may be compared and/or combined at the level of the distributed unit 120a-f, the central unit 116, the core network 104, or other connecting networks and/or user equipment 112a-f connected to the other connecting networks.

In some embodiments, the method 1000 includes a step 1040 of sending the processed data to the first central unit. For example, the processed data may be sent to the first unit via the user plane 308 or the control plane 304. In some embodiments, the method 1000 includes a step 1050 of sending the processed data to the core network 104. For example, the processed data may be sent to the core network 104 via the control plane interface 312 or the user plane interface 316. From there, the processed data may be sent to connected subnetworks and user equipment 112a-d.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A communication system comprising:
   a first core network, wherein the first core network is configured as mobile, and
   a radio access network, comprising:
   a first central unit comprising:
      a user plane interface communicatively coupled to the first core network;
      a control plane interface communicatively coupled to the first core network;
      a transceiver;
      a first router comprising a multilevel security guard, and configured to route user plane data and control plane data from a tactical waveform to the first core network, wherein the tactical waveform is one of a Protected Tactical Waveform (PTW), a Bandwidth Efficient Common Data Link (BE-CDL), a Tactical Targeting Networking Technology (TTNT), a Trellisware (TSM), or a Link-16; and
      a second router configured to communicate user plane data and control plane data from a 5G waveform to the first core network, wherein the central unit configures at least one network function of radio resource control (RRC);
   a first distributed unit, wherein the first distributed unit communicates the user plane data and the control plane data from the tactical waveform to the first router; and
   a second distributed unit, wherein the second distributed unit communicates the user plane data and control plane data from the 5G waveform to the second router; wherein the first distributed unit and the second distributed unit each configure at least one network function of packet data convergence protocol (PDCP), radio link control (RLC), medium access control (MAC), and physical link (PHY) network functions;

a first user equipment; wherein the first user equipment is configured to transmit a first signal and a second signal; wherein the first signal encodes data in the tactical waveform; wherein the second signal encodes the data in the 5G waveform;

wherein the first distributed unit is configured to receive and perform interface translation on the first signal;

wherein the second distributed unit is configured to receive and perform interface translation on the second signal;

wherein the central unit is configured to combine the first signal and the second signal.

2. The communication system of claim 1, wherein the first central unit, the first distributed unit, and the second distributed unit are localized on separate mobile platforms.

3. The communication system of claim 2, wherein the first core network and the first central unit of the radio access network are colocalized.

4. The communication system of claim 2, wherein the first core network and the first central unit of the radio access network are localized on separate mobile platforms.

5. The communication system of claim 1, further comprising a second central unit communicatively coupled to the first central unit via an Xn interface.

6. The communication system of claim 5, further comprising one or more additional distributed units communicatively coupled to the second central unit.

7. The communication system of claim 6, further comprising a second core network communicatively coupled to the second central unit.

8. The communication system of claim 7, further comprising a tactical radio interface, wherein the first distributed unit is configured to communicate with the tactical radio through the tactical radio interface via an interface translation.

9. The communication system of claim 1, wherein the first distributed unit of the communication system is configured to communicate with a tactical radio via the tactical waveform that does not conform to a 5G protocol standard.

10. The communication system of claim 1, wherein the communication system is configured to communicate via a 5G protocol standard and the tactical waveform.

11. The communication system of claim 1, wherein the communication system comprises a plurality of radio access networks, each covering a cell, wherein two or more radio access networks of the plurality of radio access networks overlap and are each operable with at least one of differing frequency bands or differing waveforms.

12. The communication system of claim 1, wherein the first core network is configured to communicate with at least one of a Secret Internet Protocol Network (SIPRNet) or a Non-classified Internet Protocol Router Network (NIPRNet).

* * * * *